US008874756B2

(12) United States Patent
Kikkawa et al.

(10) Patent No.: US 8,874,756 B2
(45) Date of Patent: Oct. 28, 2014

(54) INFORMATION PROCESSING UNIT, INFORMATION PROCESSING METHOD, CLIENT DEVICE AND INFORMATION PROCESSING SYSTEM

(75) Inventors: Norifumi Kikkawa, Tokyo (JP); Kei Yamashita, Kanagawa (JP); Seiji Miyama, Kanagawa (JP); Yasuaki Honda, Chiba (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 12/406,646

(22) Filed: Mar. 18, 2009

(65) Prior Publication Data
US 2009/0240766 A1   Sep. 24, 2009

(30) Foreign Application Priority Data
Mar. 19, 2008   (JP) .................. P2008-072374

(51) Int. Cl.
*G06F 15/16*   (2006.01)
*H04L 29/08*   (2006.01)
*H04L 12/861*   (2013.01)
*H04L 12/835*   (2013.01)
*H04L 12/807*   (2013.01)

(52) U.S. Cl.
CPC ............... *H04L 47/30* (2013.01); *H04L 67/02* (2013.01); *H04L 49/90* (2013.01); *H04L 47/27* (2013.01)
USPC ......................... 709/227; 709/232; 709/233

(58) Field of Classification Search
CPC . H04L 47/10; H04L 47/30; H04L 2012/5681; H04L 12/5693; G06F 5/06
USPC ......................................... 709/227, 232–233
See application file for complete search history.

(56) References Cited

U.S. PATENT DOCUMENTS

| | | | |
|---|---|---|---|
| 5,852,602 A | 12/1998 | Sugawara | |
| 6,345,296 B1 * | 2/2002 | McCrory et al. | 709/228 |
| 6,594,701 B1 | 7/2003 | Forin et al. | |
| 6,947,435 B1 * | 9/2005 | Chikuma et al. | 370/412 |
| 7,461,199 B2 * | 12/2008 | Conley et al. | 711/103 |
| 7,911,994 B2 * | 3/2011 | Clarke et al. | 370/328 |
| 2002/0004842 A1 | 1/2002 | Ghose et al. | |
| 2003/0126223 A1 | 7/2003 | Jenne et al. | |
| 2004/0158573 A1 * | 8/2004 | Bradley et al. | 707/102 |
| 2004/0258075 A1 * | 12/2004 | Sidenblad et al. | 370/395.5 |
| 2006/0020707 A1 | 1/2006 | Undery et al. | |
| 2007/0011358 A1 * | 1/2007 | Wiegert et al. | 709/250 |
| 2007/0169179 A1 * | 7/2007 | Narad | 726/4 |

(Continued)

FOREIGN PATENT DOCUMENTS

| | | |
|---|---|---|
| JP | 4-276948 | 10/1992 |
| JP | 2003-69610 | 3/2003 |
| JP | 2003-218977 | 7/2003 |
| JP | 2006-20301 | 1/2006 |

*Primary Examiner* — Waseem Ashraf
(74) *Attorney, Agent, or Firm* — Sony Corporation

(57) ABSTRACT

An information processing unit includes an application data receiving buffer to temporarily store data transmitted from a client device for initiating a connection, an application data receiving section to acquire the data transmitted from the client device from the application data receiving buffer and transmit the data to an upper layer application, and a flow control reception management section to transfer the data transmitted from the client device to the application data receiving buffer and monitor a free space in the application data receiving buffer and supply a data size receivable by the application data receiving buffer to the client device.

16 Claims, 14 Drawing Sheets

(56) References Cited

U.S. PATENT DOCUMENTS

| | | | |
|---|---|---|---|
| 2008/0089347 A1* | 4/2008 | Phillipi et al. | 370/400 |
| 2008/0114894 A1* | 5/2008 | Deshpande | 709/237 |
| 2008/0313518 A1* | 12/2008 | Naoe et al. | 714/748 |
| 2009/0217030 A1* | 8/2009 | Premkumar et al. | 713/153 |
| 2009/0268747 A1* | 10/2009 | Kurata et al. | 370/412 |
| 2010/0046370 A1* | 2/2010 | Ghose et al. | 370/235 |

* cited by examiner

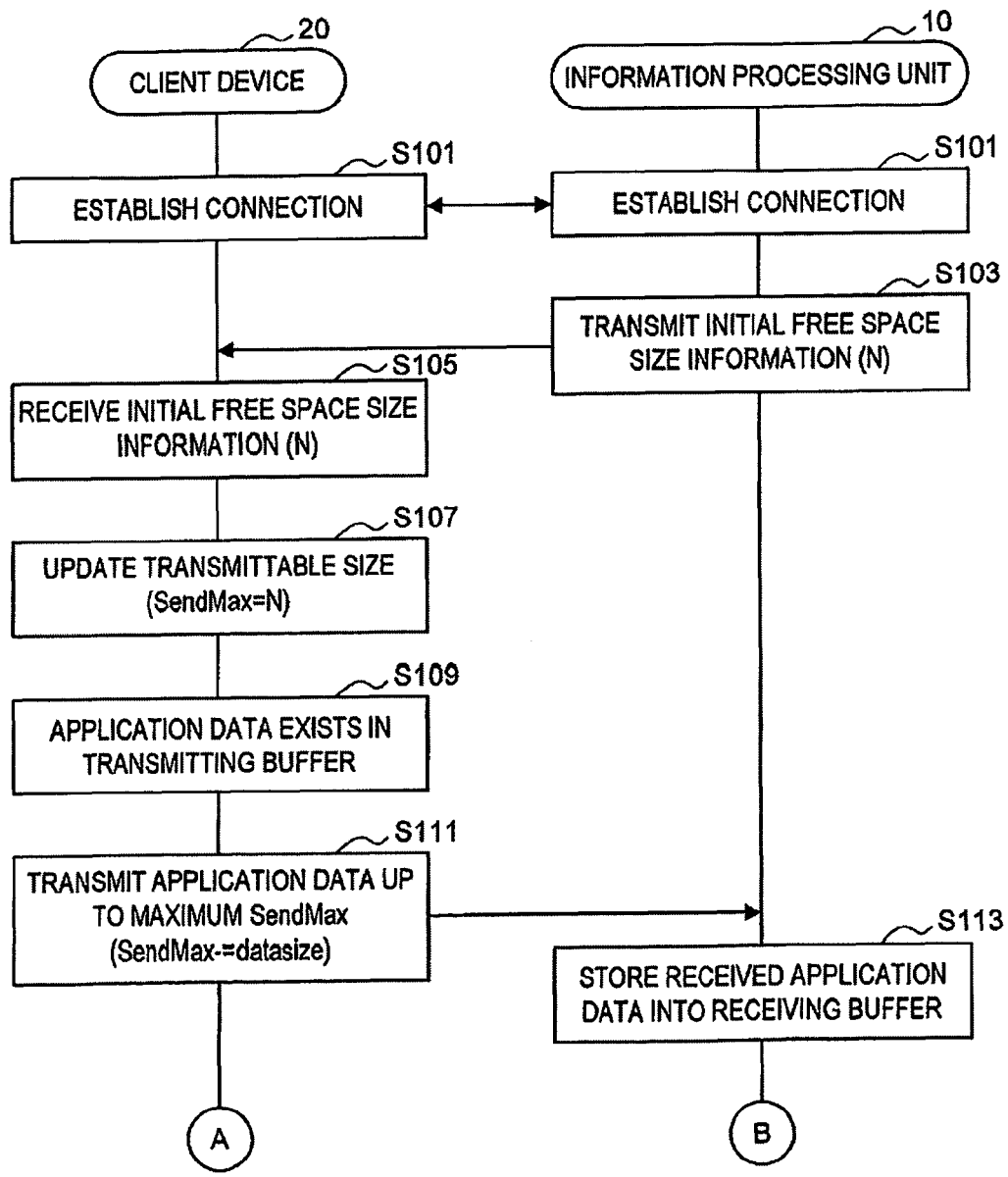

TUNNELING
1) SSL TUNNELING
2) HTTP TUNNELING

NO DATA TRANSMISSION FOR GIVEN TIME PERIOD

INFORMATION PROCESSING UNIT, INFORMATION PROCESSING METHOD, CLIENT DEVICE AND INFORMATION PROCESSING SYSTEM

CROSS-REFERENCE TO RELATED APPLICATION

The present invention contains subject matter related to Japanese Patent Application JP 2008-072374 filed in the Japan Patent Office on Mar. 19, 2008, the entire contents of which being incorporated herein by reference.

BACKGROUND OF THE INVENTION

1. Field of the Invention

The present invention relates to an information processing unit, an information processing method, a client device and an information processing system.

2. Description of the Related Art

There are a plurality of techniques to connect a server and a client device by remote access over the Internet. Among them, HTTP tunneling is known as an example of a technique used in the environment where a firewall, a proxy server or the like is installed at the gateway of a LAN on the client side so as to ensure the security of a computer placed in the LAN. Further, a technique may be used that transmits a control signal called a heartbeat from a unit at the transmitting end to a unit at the receiving end in order to maintain a connection between a server and a client device even when data communication is not performed for a given period of time (cf. e.g. Japanese Patent Application Publication No. 2006-20301).

SUMMARY OF THE INVENTION

A server at the data receiving end temporarily stores transmitted data into a prescribed buffer (e.g. a TCP receiving buffer). If a free space in the receiving buffer runs out, a client device at the data transmitting end fails to transmit data including a heartbeat.

Under the circumstance, if the control condition "close a connection when data communication is not performed for a given period of time" is set to a proxy server, a remote access connection between the server and the client device can be closed by the proxy server.

In light of the foregoing, it is desirable to provide a novel and improved information processing unit, information processing method, client device and information processing system capable of maintaining a remote access connection between a server and a client device via a proxy server regardless of the setting of the proxy server.

According to an embodiment of the present invention, there is provided an information processing unit that includes a connection wait section to establish a connection with a client device for initiating a connection, and a data receiving section to receive data transmitted from the client device, the data receiving section including an application data receiving buffer to temporarily store data transmitted from the client device, an application data receiving section to acquire the data transmitted from the client device from the application data receiving buffer and transmit the data to an upper layer application, and a flow control reception management section to monitor a free space in the application data receiving buffer and supply a data size receivable by the application data receiving buffer to the client device, and transfer the data transmitted from the client device to the application data receiving buffer.

In this configuration, the flow control reception management section monitors a free space in the application data receiving buffer and supplies a data size receivable by the application data receiving buffer to the client device, and transfers the data transmitted from the client device to the application data receiving buffer, and the application data receiving section acquires the data transmitted from the client device from the application data receiving buffer and transmits the data to an upper layer application.

The flow control reception management section may supply a data size receivable by the application data receiving buffer to the client device upon establishment of a connection with the client device.

The flow control reception management section may supply an increment in the free space to the client device upon increase in the free space.

The information processing unit may further include a communication section to control communication with the client device, and a communication section receiving buffer to temporarily store data received from the client device by the communication section, and the flow control reception management section may transfer the data temporarily stored in the communication section receiving buffer to the application data receiving buffer.

The information processing unit may further include a connection maintenance control information receiving section to receive connection maintenance control information transmitted from the client device, and the connection maintenance control information receiving section may discard the received connection maintenance control information upon reception of the connection maintenance control information.

The information processing unit may further include a data transmitting section to transmit data to the client device, the data transmitting section including an application data transmitting buffer to temporarily store data to be transmitted to the client device, an application data transmitting section to acquire data to be transmitted to the client device from an upper layer application and transfer the data to the application data transmitting buffer, and a flow control transmission management section to acquire the data from the application data transmitting buffer and transmit the acquired data to the client device based on a data size receivable by the client device, supplied from the client device.

The information processing unit may further include a communication section to control communication with the client device, and a communication section transmitting buffer to temporarily store data to be transmitted to the client device by the communication section, and the flow control transmission management section may transfer the data temporarily stored in the application data transmitting buffer to the communication section transmitting buffer.

According to another embodiment of the present invention, there is provided an information processing method that includes the steps of establishing a connection with a client device for initiating a connection, supplying a data size receivable by an application data receiving buffer to the client device based on a free space in the application data receiving buffer to temporarily store data transmitted from the client device, temporarily storing the data transmitted from the client device into the application data receiving buffer, and transmitting the data temporarily stored in the application data receiving buffer to an upper layer application.

The information processing method may further include the steps of acquiring data to be transmitted to the client device from an upper layer application and transferring the acquired data to an application data transmitting buffer to temporarily store data to be transmitted to the client device, and acquiring the data from the application data transmitting buffer and transmitting the acquired data to the client device based on a data size receivable by the client device, supplied from the client device.

According to yet another embodiment of the present invention, there is provided a client device that includes a connection establishment section to initiate a connection with an information processing unit and establish a connection with the information processing unit, and a data transmitting section to transmit data to the information processing unit, the data transmitting section including an application data transmitting buffer to temporarily store data to be transmitted to the information processing unit, an application data transmitting section to acquire data to be transmitted to the information processing unit from an upper layer application and transfer the data to the application data transmitting buffer, and a flow control transmission management section to acquire the data from the application data transmitting buffer and transmit the acquired data to the information processing unit based on a data size receivable by the information processing unit, supplied from the information processing unit.

The client device may further include a data receiving section to receive data transmitted from the information processing unit, the data receiving section including an application data receiving buffer to temporarily store data transmitted from the information processing unit, an application data receiving section to acquire the data transmitted from the information processing unit from the application data receiving buffer and transmit the data to an upper layer application, and a flow control reception management section to monitor a free space in the application data receiving buffer and supply a data size receivable by the application data receiving buffer to the information processing unit, and transfer the data transmitted from the information processing unit to the application data receiving buffer.

According to still another embodiment of the present invention, there is provided an information processing method that includes the steps of initiating a connection with an information processing unit and establishing a connection with the information processing unit, acquiring data to be transmitted to the information processing unit from an upper layer application and transferring the acquired data to an application data transmitting buffer to temporarily store data to be transmitted to the information processing unit, and acquiring the data from the application data transmitting buffer and transmitting the acquired data to the information processing unit based on a data size receivable by the information processing unit, supplied from the information processing unit.

According to another embodiment of the present invention, there is provided an information processing system that includes the information processing unit and the client device.

The data transmitting section included in the client device may further include a connection maintenance control information transmitting section to transmit connection maintenance control information for maintaining a connection established with the information processing unit, and the connection maintenance control information transmitting section may transmit the connection maintenance control information to the information processing unit when communication is not performed with the information processing unit for a given period of time.

According to the embodiments of the present invention described above, it is possible to maintain a remote access connection between a server and a client device via a proxy server regardless of the setting of the proxy server.

BRIEF DESCRIPTION OF THE DRAWINGS

FIG. 7A is a flowchart illustrating an information processing method performed in an information processing system according to the embodiment.

DETAILED DESCRIPTION OF THE PREFERRED EMBODIMENTS

Figure 1:
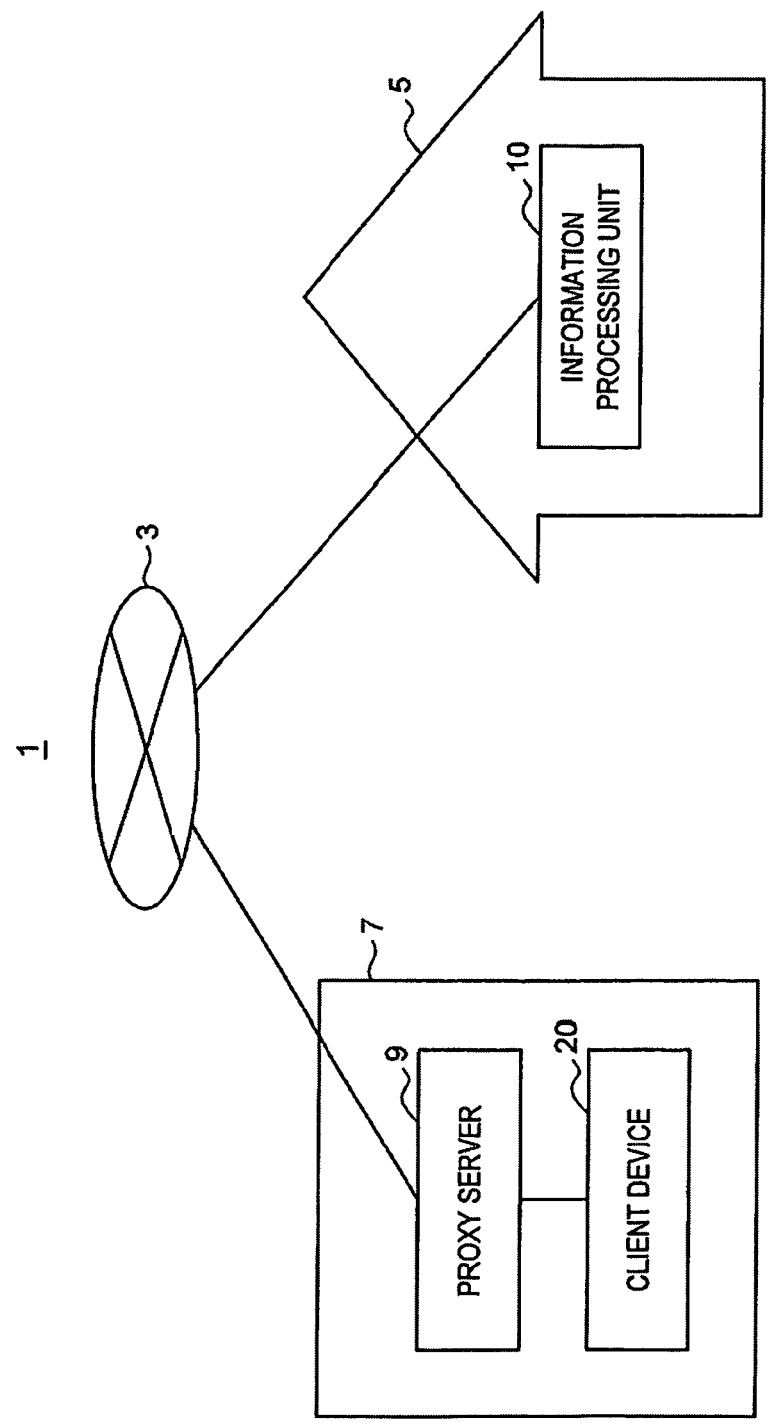
FIG. 1 is an explanatory view illustrating an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Remote Access Connection>

Figure 9A:
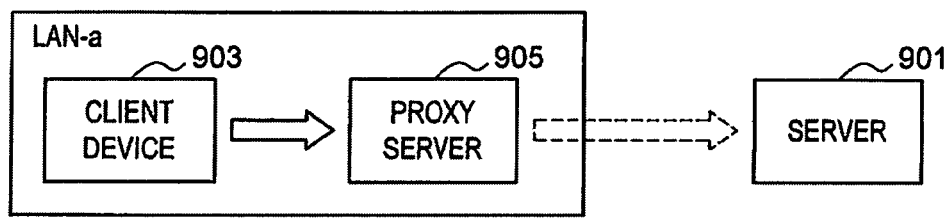
FIG. 9A is an explanatory view illustrating a remote access connection.
Figure 9B:
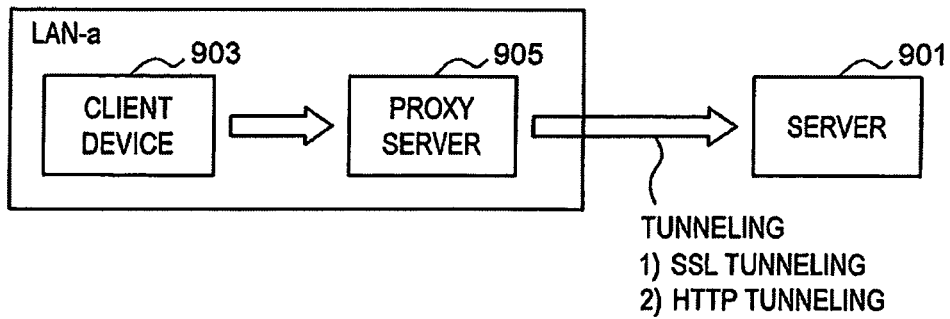
FIG. 9B is an explanatory view illustrating a remote access connection.
Figure 10A:
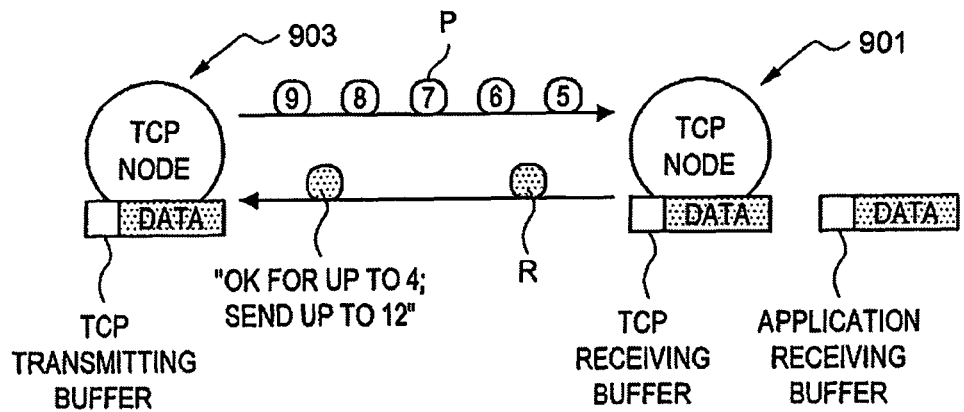
FIG. 10A is an explanatory view illustrating flow control in TCP.
Figure 10B:
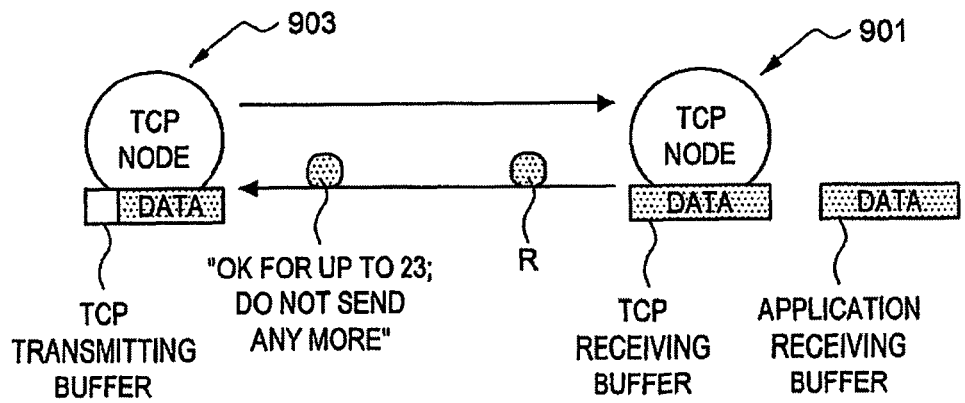
FIG. 10B is an explanatory view illustrating flow control in TCP.
Figure 11:
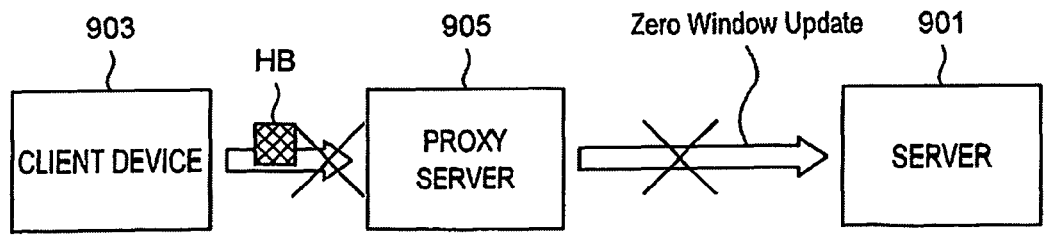
FIG. 11 is an explanatory view illustrating an issue in a remote access connection via a proxy server.

Before describing an information processing system according to a first embodiment of the present invention, a connection using remote access will be explained in detail. In order to address the above-described issue, the inventors of the present invention have conducted in-depth studies about a connection by remote access firstly. The result of the studies is described hereinafter with reference to FIGS. 9A to 9D. FIGS. 9A to 9D are explanatory views illustrating connections using remote access. FIGS. 10A and 10B are explanatory views illustrating flow control in TCP. FIG. 11 is an explanatory view illustrating an issue in a remote access connection via a proxy server.

A technique to establish a connection by remote access between a server and a client device over the Internet is as follows. In such a case, if a proxy server 905 is installed in the environment of a client device 903 (i.e. a LAN to which the client device 903 belongs) as shown in FIG. 9A, for example, a traffic other than a limited protocol such as Hypertext Transfer Protocol (HTTP) and Secure Socket Layer (SSL) may be broken down, although depending on the setting of the proxy server 905.

As a technique to enable remote access through a firewall (HTTP proxy server 905), there are two kinds of techniques: SSL tunneling and HTTP tunneling, as shown in FIG. 9B.

The SSL tunneling technique makes a connection by SSL via the proxy server 905 and performs arbitrary communication between the server 901 and the client device 903 through an encrypted communication channel. However, depending on the setting of an HTTP proxy (proxy server 905), the object of SSL is limited to HTTPS (SSL for HTTP), so that access not through the port 443, which is defined as a well-known port of HTTPS, may be denied. In such a case, it is necessary to set the port to 443 in the environment on the server 901 side of remote access. Further, when Network Address Translation (NAT) is used in the server, a connection to a port outside NAT is forwarded to a unit inside by port-forwarding configuration, and it is necessary to set the port outside NAT to 443. Because port forwarding for one port can be performed in only one server in NAT, it is not available if there are two or more servers in NAT.

The other technique, HTTP tunneling, is as follows. The proxy server 905, which is an HTTP proxy, relays communication using HTTP. Thus, the HTTP tunneling technique regards the body of HTTP communication as a communication channel and performs data communication between the server 901 and the client device 903. The HTTP tunneling technique enables transmission of given data at a given timing in an HTTP POST transaction for transmission without terminating the request body. Likewise, it enables reception of given data at a given timing in an HTTP GET transaction without terminating the response body. This technique carries out an HTTP POST transaction and an HTTP GET transaction in parallel, thereby securing a two-way communication channel with a connection target unit.

Figure 9C:
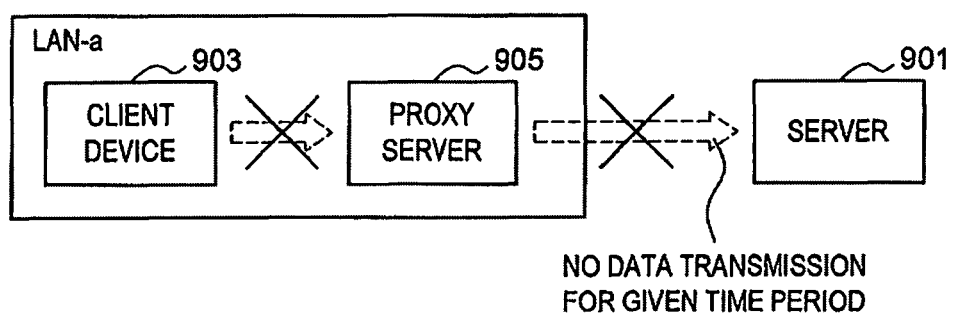
FIG. 9C is an explanatory view illustrating a remote access connection.
Figure 9D:
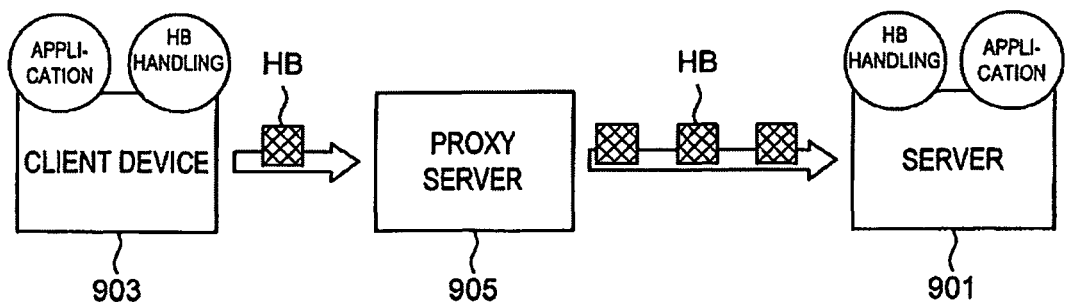
FIG. 9D is an explanatory view illustrating a remote access connection.

Upon implementation of the HTTP proxy (proxy server 905), it may be set so as to disconnect a connection if data is not transmitted through the request body of HTTP POST for a given period of time as shown in FIG. 9C, for example. In order to deal with such a proxy server, the following is performed for the purpose of avoiding the state where data is not transmitted for a prescribed period of time.

Specifically, a heartbeat transmitting/receiving section that transmits or receives a control signal called a heartbeat is placed between a layer of an application that uses HTTP tunneling as a connection and a layer that actually implements HTTP tunneling. If an application at the transmitting end does not transmit data for a given period of time, the heartbeat transmitting section transmits heartbeat data HB to the receiving end. A heartbeat receiving section in a unit at the receiving end discards the received heartbeat data HB.

By such processing, it is possible to prevent the proxy server 905 from detecting the status where data communication is not performed for a given period of time (inactive detection), thereby maintaining a remote access connection that is established between the server 901 and the client device 903.

<Flow Control of TCP>

Flow control in TCP is described hereinafter in detail with reference to FIGS. 10A and 10B.

In Transmission Control Protocol (TCP), a sequence number is assigned to data to be transmitted as shown in FIG. 10A. A TCP node (client device) 903 at the transmitting end divides data stored in a TCP transmitting buffer into several packets P and assigns a sequence number to each packet; and then transmits the packets to a TCP node (server) 901 at the receiving end. The TCP node (server) 901 temporarily stores the received packets P in a TCP receiving buffer, and the stored data is transferred to an application receiving buffer at a given timing. The TCP node 901 gives notification about up to what sequence number of data it has received to the TCP node 903, thereby taking measures against data interruption.

Further, the TCP node 901 at the receiving end transmits data R indicating up to what sequence number of data it can receive next time to the TCP node 903 at the transmitting end. For example, in the example shown in FIG. 10A, the data R indicating that "data up to 4 is received; send data up to 12" is transmitted from the TCP node 901 to the TCP node 903. Receiving the data R, the TCP node 903 transmits the data up to the packet P to which the sequence number 12 is assigned to the TCP node 901.

The data size receivable by a TCP node at the receiving end is called a window size, and by adjusting the window size, flow control is implemented in TCP. Specifically, the throughput of communication is increased by gradually enlarging the window size during communication, and upon occurrence of data error due to insufficient bandwidth of a communication channel, the window size is decreased.

If an application at the receiving end reads data from a TCP receiving buffer at the receiving end late or it does not read data, a free space in the TCP receiving buffer becomes zero as shown in FIG. 10B, for example. In the state where the TCP is not ready to receive data, the receiving end transmits data R indicating that "the window size is 0" (which is referred to hereinafter also as zero window update). The zero window update is periodically transmitted from a unit at the receiving end to a unit at the transmitting end.

The heartbeat data HB is data on TCP, just like application data. Thus, in the state where the TCP buffer at the receiving end is full and the zero window update is transmitted periodically as shown in FIG. 10B, the client device 903 at the transmitting end is unable to transmit the heartbeat data HB. This raises a possibility that the HTTP proxy server 905 on a channel that detects inactivity for a given period of time will block a communication channel by remote access that has been established between the server 901 and the client device 903.

The inventors of the present invention have conducted intensive studies in order to overcome the above issue and have found the information processing system as described below.

First Embodiment

<Information Processing System>

An information processing system according to a first embodiment of the present invention is described hereinafter in detail with reference to FIG. 1. FIG. 1 is an explanatory view illustrating an information processing system according to the embodiment.

An information processing system 1 according to the embodiment includes a network 5 to which an information processing unit 10 according to the embodiment belongs and a network 7 to which a client device 20 according to the embodiment belongs as shown in FIG. 1, for example. The network 5 to which the information processing unit 10 belongs and the network 7 to which the client device 20 belongs can be connected to each other through the Internet 3. Further, a proxy server (HTTP proxy) 9 is installed in the network 7 to which the client device 20 belongs.

The information processing unit 10 and the client device 20 according to the embodiment each have a remote access function, and they can communicate with each other using the HTTP tunneling technique. In the following description, the client device 20 indicates a device that initiates a connection, and it does not indicate whether it is a unit at the data transmitting end or a unit at the data receiving end. Likewise, the information processing unit 10 indicates a device that receives initiation of a connection, and it does not indicate whether it is a unit at the data receiving end or a unit at the data transmitting end.

The Internet 3 is a communication network that connects the information processing unit 10 and the client device 20 so as to enable two-way communication or one-way communication by wired or wireless means. The proxy server 9 is an HTTP proxy that functions as a firewall, which is placed between the Internet 3 and the client device 20.

The information processing unit 10 and the client device 20 are units having a remote access function, and various functions can be implemented by executing upper layer applications that are installed in the units. The information processing unit 10 and the client device 20 may be computer devices such as a personal computer and a server or home information appliances having a communication function through a network such as a TV set, a DVD/HDD recorder, a cellular phone, a personal digital assistant (PDA), a digital camera, a home video game machine and a digital video camera. Further, the information processing unit 10 and the client device 20 may be portable devices that can be carried by a contractor such as a portable video game player, a PHS and a portable video/audio player. Furthermore, the information processing unit 10 and the client device 20 may be a digital media server (DMS), a digital media player (DMP), a digital media renderer (DMR), a digital media controller and so on conforming to the DLNA guideline.

The information processing unit 10 and the client device 20 are described in further detail below.

<Configuration of the Information Processing Unit>

Figure 2:
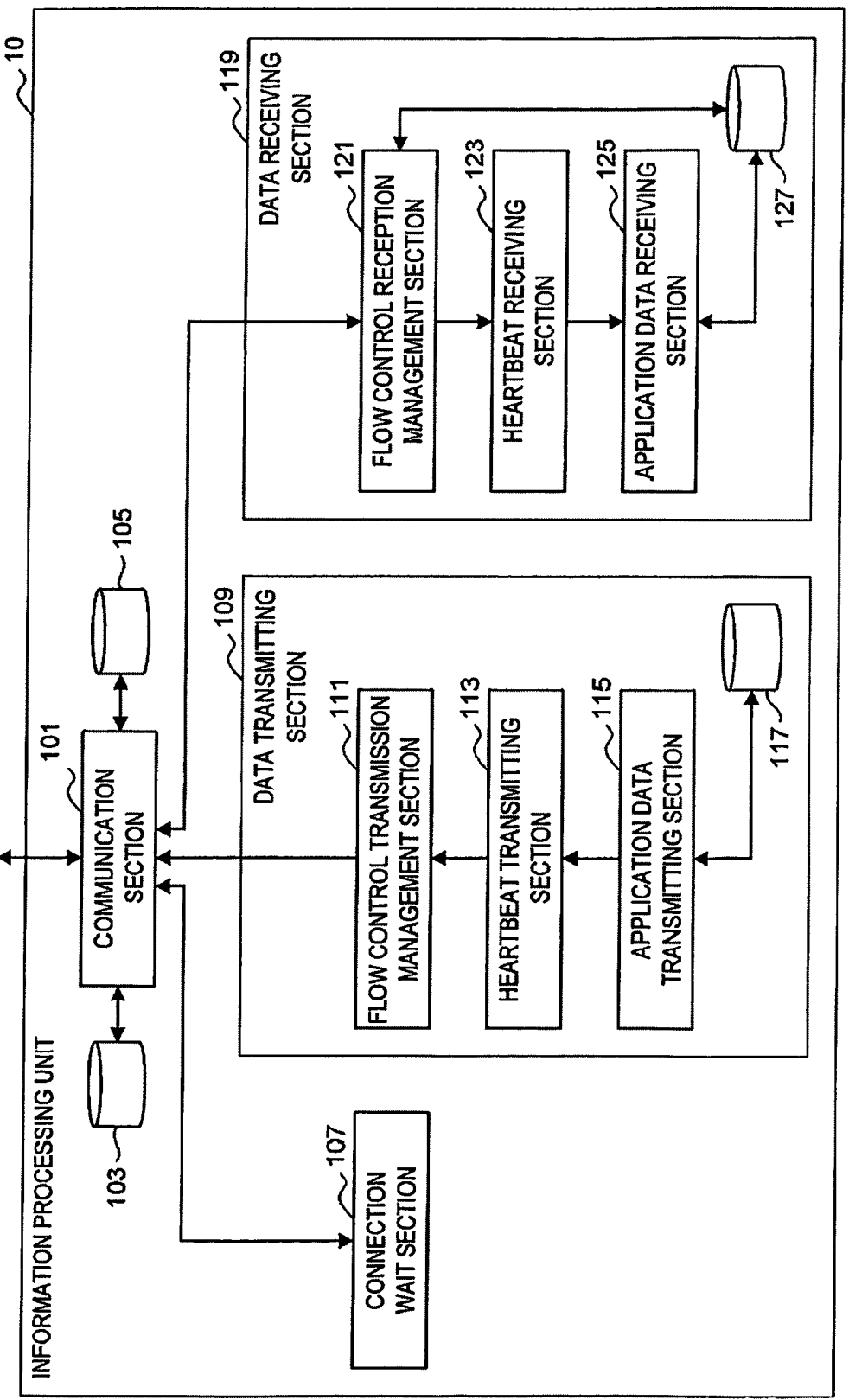
FIG. 2 is a block diagram illustrating the configuration of an information processing unit according to the embodiment.

The configuration of the information processing unit according to the embodiment is described hereinafter in detail with reference to FIG. 2. FIG. 2 is a block diagram illustrating the configuration of the information processing unit 10 according to the embodiment.

The information processing unit 10 according to the embodiment mainly includes a communication section 101, a TCP transmitting buffer 103, a TCP receiving buffer 105, a connection wait section 107, a data transmitting section 109, and a data receiving section 119 as shown in FIG. 2, for example.

The communication section 101 is a processing section composed of a central processing unit (CPU), read only memory (ROM), random access memory (RAM), a communication unit and so on, for example, and further includes a network interface. The communication section 101 is a stack capable of performing communication control based on two types of protocols: transmission control protocol (TCP) and internet protocol (IP). The information processing unit 10 according to the embodiment communicates with a unit belonging to the same network or a unit belonging to a different network via the communication section 101.

The TCP transmitting buffer 103, which is an example of a communication section transmitting buffer, and the TCP receiving buffer 105, which is an example of a communication section receiving buffer, are buffers composed of a recording unit such as ROM, RAM, hard disk drive (HDD) and so on, for example. The communication section 101 can freely access those buffers.

The TCP transmitting buffer 103 is a buffer in which data to be transmitted by TCP of the communication section 101 is stored temporarily, and the TCP receiving buffer 105 is a buffer in which data received by TCP of the communication section 101 is stored temporarily.

The connection wait section 107, which is an example of a connection wait section, is composed of a CPU, ROM, RAM and so on, for example. The connection wait section 107 waits for a connection request (e.g. a request for establishing HTTP tunneling) that is transmitted from the client device 20, which is described later, via the proxy server 9, executes authentication, encryption key determination and so on necessary for establishing a connection, and enables data transmission and reception.

The data transmitting section 109 is composed of a CPU, ROM, RAM and so on, for example, and it transmits application data that is transferred from an upper layer application to a transmission destination information processing unit or client device via the communication section 101. The data transmitting section 109 includes a flow control transmission management section 111, a heartbeat transmitting section 113, an application data transmitting section 115, and an application data transmitting buffer 117.

The flow control transmission management section 111 is a processing section that manages transmission of application data based on TCP flow control described above. The flow control transmission management section 111 manages transmission of application data transferred from the application data transmitting section 115, which is described later, based on the data size that is receivable by a transmission destination unit, which is notified from the destination unit. The management of transmission of application data includes a series of flow control in TCP, such as assigning a sequence number to a packet of application data to be transmitted, transmitting application data to a destination unit, and providing reliability in packet data correction, retransmission or the like.

The flow control transmission management section 111 acquires application data to be transmitted from the application data transmitting buffer 117, which is described later, and temporarily stores the application data to be transmitted in the TCP transmitting buffer 103 by flow control. The communication section 101 transmits application data packet stored in the TCP transmitting buffer 103 to a destination unit.

If the transmission of application data is not executed for a given period of time, the flow control transmission management section 111 may notify that to the heartbeat transmitting section 113, which is described later.

If communication is not performed for a given period of time with a unit as a destination of application data, the heartbeat transmitting section 113, which is an example of a connection maintenance control information transmitting section, transmits heartbeat data, which is an example of connection maintenance control information, to the destination unit. The heartbeat data that is generated in the heartbeat transmitting section 113 is transmitted to the destination unit via the flow control transmission management section 111 and the communication section 101.

By transmitting the heartbeat data to a destination unit, communication is carried out between the information processing unit 10 according to the embodiment and the destination unit, thereby allowing an established connection to be maintained.

The application data transmitting section 115 temporarily records application data requested to be transmitted by an upper layer application into the application data transmitting buffer 117, which is described later. Further, the application data transmitting section 115 may notify that the application data is stored in the application data transmitting buffer 117 to the flow control transmission management section 111 via the heartbeat transmitting section 113.

The application data transmitting buffer 117 is a buffer composed of a recording unit such as ROM, RAM or hard disk drive (HDD). In the application data transmitting buffer 117, application data that is acquired from an upper layer application by the application data transmitting section 115 is temporarily recorded. The flow control transmission management section 111 and the application data transmitting section 115 can freely read and write data on the application data transmitting buffer 117.

The data receiving section 119 is composed of a CPU, ROM, RAM and so on, for example, and it receives application data transmitted from a destination information processing unit or client device via the communication section 101. The data receiving section 119 includes a flow control reception management section 121, a heartbeat receiving section 123, an application data receiving section 125, and an application data receiving buffer 127.

The flow control reception management section 121 is a processing section that manages reception of application data based on TCP flow control described above. The flow control reception management section 121 monitors the state of the application data receiving buffer 127 such as the use condition of the data size that is recordable in the application data receiving buffer 127, which is described later. Further, the flow control reception management section 121 acquires the application data that is received by the communication section 101 and temporarily stored in the TCP receiving buffer 105 and transfers it to the application data receiving section 125, which is described later.

When a connection is established between the information processing unit 10 according to the embodiment and a transmission source unit, the flow control reception management section 121 refers to the use condition of the application data receiving buffer 127 and transmits a free space in the application data receiving buffer 127 as initial free space size data indicating the data size receivable by the information processing unit 10 to the unit with which a connection is established. Further, according to a result of monitoring the application data receiving buffer 127, when a free space in the application data receiving buffer 127 of the information processing unit 10 according to the embodiment increases, the flow control reception management section 121 transmits an increment in the free space size as increment size data to the unit with which a connection is established.

As described above, the flow control reception management section 121 according to the embodiment determines initial free space size data and increment size data to be transmitted to a transmission source unit according to the use condition of the application data receiving buffer 127. Therefore, the size of application data that is transmitted from the transmission source unit is always equal to or smaller than the data size that can be stored in the application data receiving buffer 127, thereby preventing a free space in the TCP receiving buffer 105 from running out.

The heartbeat receiving section 123, which is an example of a connection maintenance control information receiving section, receives heartbeat data that is transmitted from a unit as a transmission source of application data. The received heartbeat data is discarded by the heartbeat receiving section 123.

Because the information processing unit 10 according to the embodiment performs flow control according to a space in the application data receiving buffer 127 as described above, running out of a free space in the TCP receiving buffer 105 does not occur. Therefore, failure to receive heartbeat data itself does not occur. Consequently, it is possible to maintain a connection (session) that is established between the information processing unit 10 and a transmission destination unit regardless of the setting of the proxy server 9.

The application data receiving section 125 acquires the application data stored in the application data receiving buffer 127 and transfers it to an upper layer application. As a result that the application data receiving section 125 transfers the data to an upper layer application, a free space in the application data receiving buffer 127 changes.

The application data receiving buffer 127 is a buffer composed of a recording unit such as ROM, RAM, hard disk drive (HDD) and so on, for example. In the application data receiving buffer 127, application data that is transmitted from a unit with which a connection is established and received by the information processing unit 10 according to the embodiment is temporarily recorded. The flow control reception management section 121 and the application data receiving section 125 can freely read and write data on the application data receiving buffer 127.

Further, the information processing unit 10 according to the embodiment can implement various processing that function as upper layer applications by executing programs or the like recorded in a storage section composed of ROM, RAM, HDD and so on, though not shown, on a CPU. The upper layer applications can freely read and write data on the application data transmitting buffer 117 and the application data receiving buffer 127 according to the embodiment.

One example of such upper layer applications is various kinds of control programs conforming to the digital living network alliance (DLNA) guideline.

In the foregoing, one example of the functions of the information processing unit 10 according to the embodiment is described. Each of the above-described elements may be configured using a general-purpose member or circuit, or it may be configured by hardware specialized to the function of each element. Further, the function of each element may be entirely realized by CPU or the like. It is thereby possible to change the configuration to use as appropriate according to the technique level when implementing the embodiment.

<Configuration of the Client Device>

Figure 3:
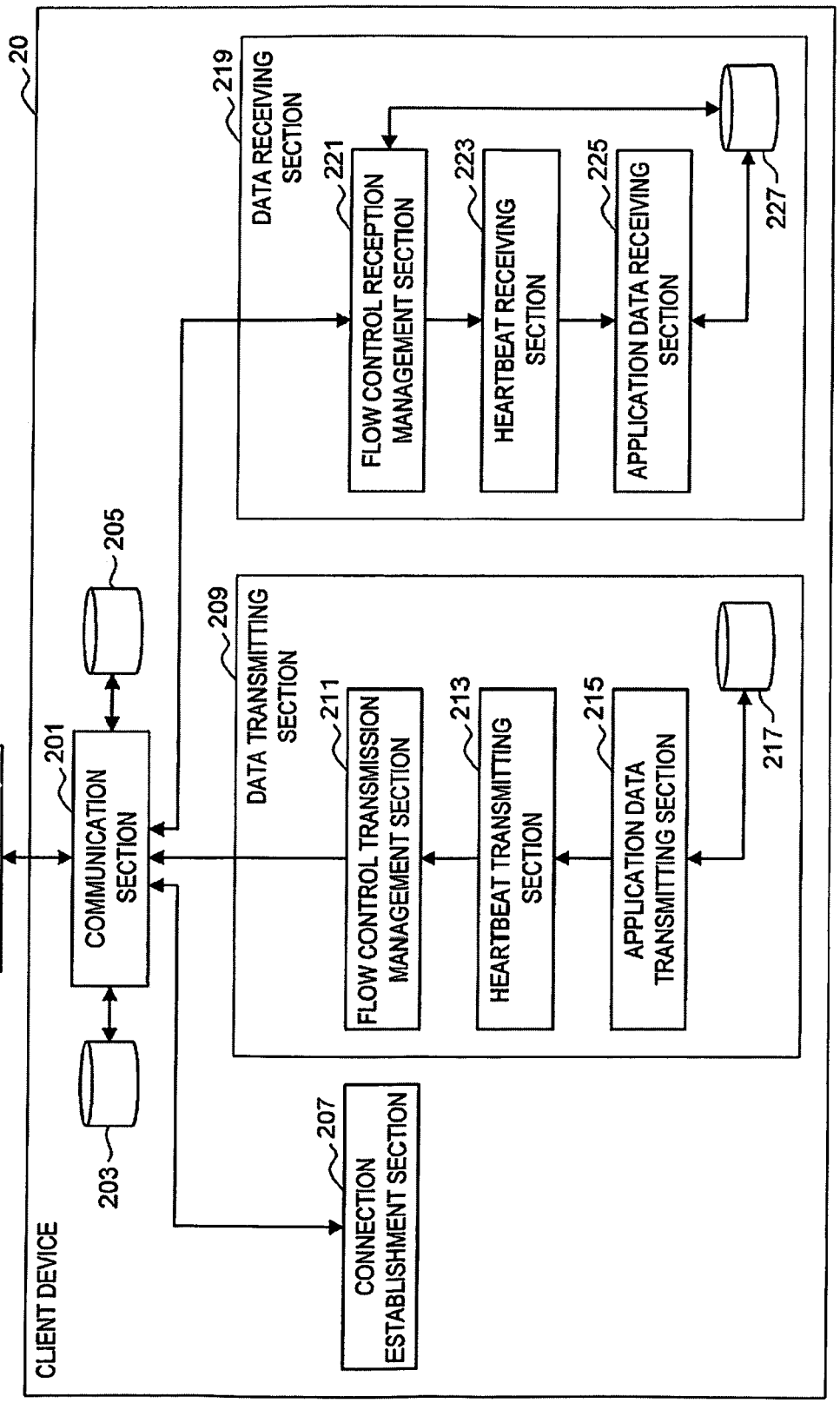
FIG. 3 is a block diagram illustrating the configuration of a client device according to the embodiment.

The configuration of the client device according to the embodiment is described hereinafter in detail with reference to FIG. 3. FIG. 3 is a block diagram illustrating the configuration of the client device 20 according to the embodiment.

The client device 20 according to the embodiment mainly includes a communication section 201, a TCP transmitting buffer 203, a TCP receiving buffer 205, a connection establishment section 207, a data transmitting section 209 and a data receiving section 219.

The communication section 201, the TCP transmitting buffer 203, the TCP receiving buffer 205, the data transmitting section 209 and the data receiving section 219 that are included in the client device 20 respectively have substantially the same configuration and effects as the communication section 101, the TCP transmitting buffer 103, the TCP receiving buffer 105, the data transmitting section 109 and the data receiving section 119 that are included in information processing unit 10 according to the embodiment, and therefore detailed explanation is omitted.

The connection establishment section 207, which is an example of a connection establishment section, is composed of a CPU, ROM, RAM, and so on, for example. The connection establishment section 207 transmits a connection request (e.g. a request for establishing HTTP tunneling) to the information processing unit 10 according to the embodiment via the proxy server 9 and establishes HTTP tunneling with the information processing unit 10. Further, the connection establishment section 207 executes authentication, encryption key determination and so on necessary for establishing a connection, and enables data transmission and reception.

Further, the client device 20 according to the embodiment can implement various processing that function as upper layer applications by executing programs or the like recorded in a storage section composed of ROM, RAM, HDD and so on, though not shown, on a CPU. The upper layer applications can freely read and write data on the application data transmitting buffer 217 and the application data receiving buffer 227 according to the embodiment.

One example of such upper layer applications is various kinds of control programs conforming to the digital living network alliance (DLNA) guideline.

In the foregoing, one example of the functions of the client device 20 according to the embodiment is described. Each of the above-described elements may be configured using a general-purpose member or circuit, or it may be configured by hardware specialized to the function of each element. Further, the function of each element may be entirely realized by CPU or the like. It is thereby possible to change the configuration to use as appropriate according to the technique level when implementing the embodiment.

<Information Processing Method>

Figure 4:
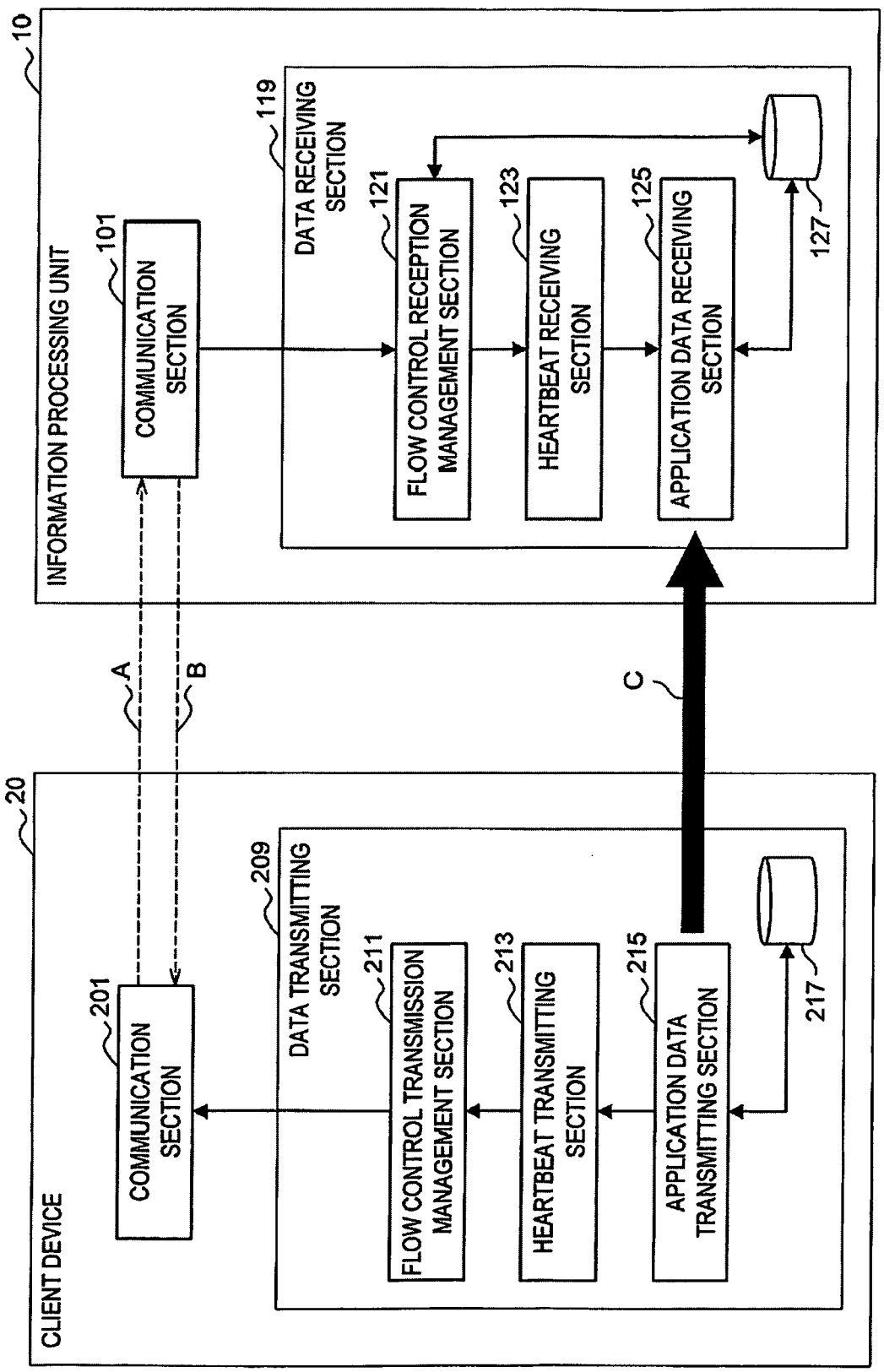
FIG. 4 is an explanatory view schematically illustrating an information processing system according to the embodiment.
Figure 5:
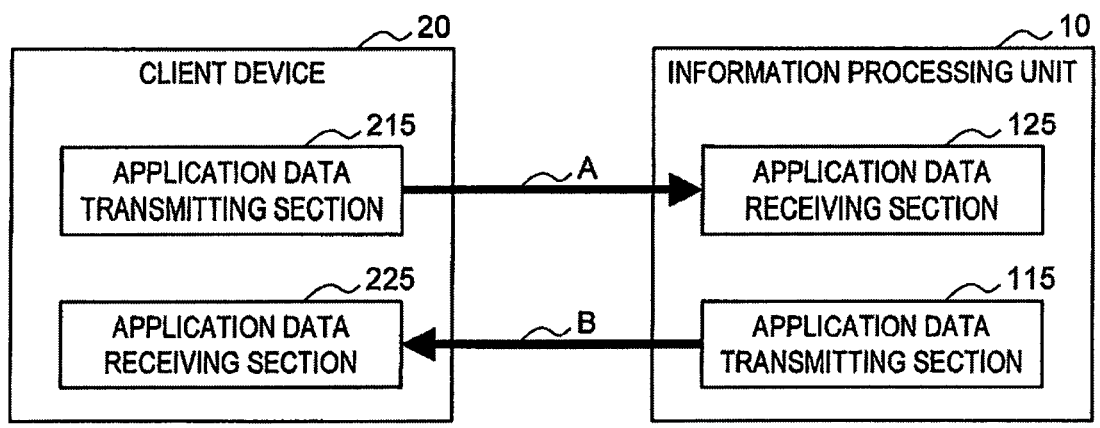
FIG. 5 is an explanatory view schematically illustrating an information processing system according to the embodiment.

An information processing method that is performed in the information processing unit 10 and the client device 20 according to the embodiment is described hereinafter in detail with reference to FIGS. 4 to 7C. FIGS. 4 and 5 are explanatory views schematically illustrating an information processing system according to the embodiment. FIGS. 6A to 6D are explanatory views illustrating an information processing method performed in an information processing system according to the embodiment. FIGS. 7A to 7C are flowcharts illustrating an information processing method performed in an information processing system according to the embodiment.

In an information processing system 1 according to the embodiment, TCP asynchronous full-duplex communications A and B by HTTP tunneling are established between the communication section 101 of the information processing unit 10 and the communication section 201 of the client device 20 as shown in FIG. 4, for example. Therefore, the information processing method according to the embodiment is applicable both in the case of transmitting application data and heartbeat data from the client device 20 to the information processing unit 10 and in the case of transmitting application data and heartbeat data from the information processing unit 10 to the client device 20 as shown in FIG. 5, for example.

For example, in the case of transmitting data from the client device 20 to the information processing unit 10, transmission of application data and heartbeat data is performed through a connection A, and transmission of data such as an increment in a free space from the information processing unit 10 is performed through a connection B.

Consider, for example, the case of executing data transmission indicated by a connection C from the application data transmitting section 215 of the client device 20 to the application data receiving section 125 of the information processing unit 10 as shown in FIG. 4, for example. In such a case, the data transmitting section 209 of the client device 20 makes a connection via the communication section 201 to the communication section 101 of the information processing unit 10 using TCP asynchronous full-duplex communications by HTTP tunneling. After a connection is established between the communication section 201 of the client device 20 and the communication section 101 of the information processing unit 10, the data transmitting section 209 of the client device 20 transmits application data to the data receiving section 119 of the information processing unit 10.

The above-described flow control may be performed both in a connection on the POST side and a connection on the GET side or performed only in either one of a connection on the POST side or a connection on the GET side. By changing the setting as appropriate in this manner, it is possible to control the loads on the system according to the capacity of the information processing unit 10 and the client device 20 according to the embodiment.

The information processing method according to the embodiment is described hereinafter in further detail with reference to FIGS. 6A to 6D. In the below-described case, the client device 20 serves as a unit at the data transmitting end and the information processing unit 10 serves as a unit at the data receiving end, so that the client device 20 transmits data to the information processing unit 10.

Figure 6A:
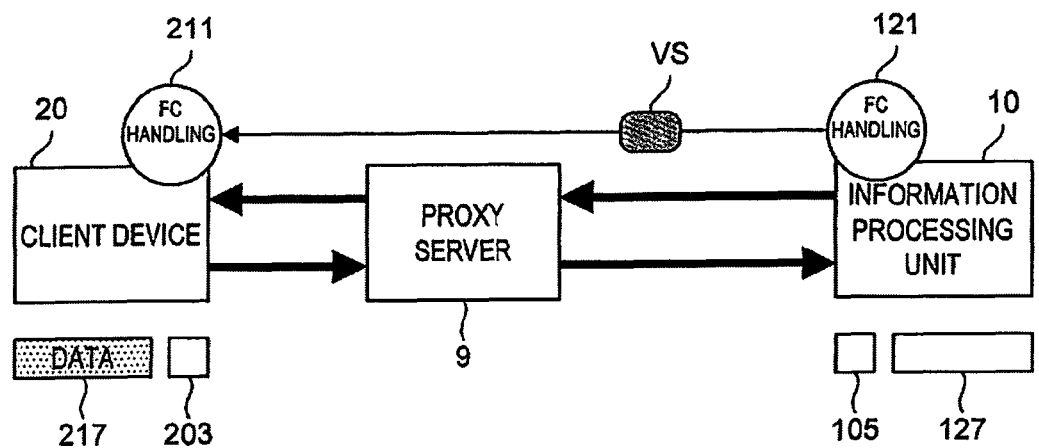
FIG. 6A is an explanatory view illustrating an information processing method performed in an information processing system according to the embodiment.
Figure 7B:
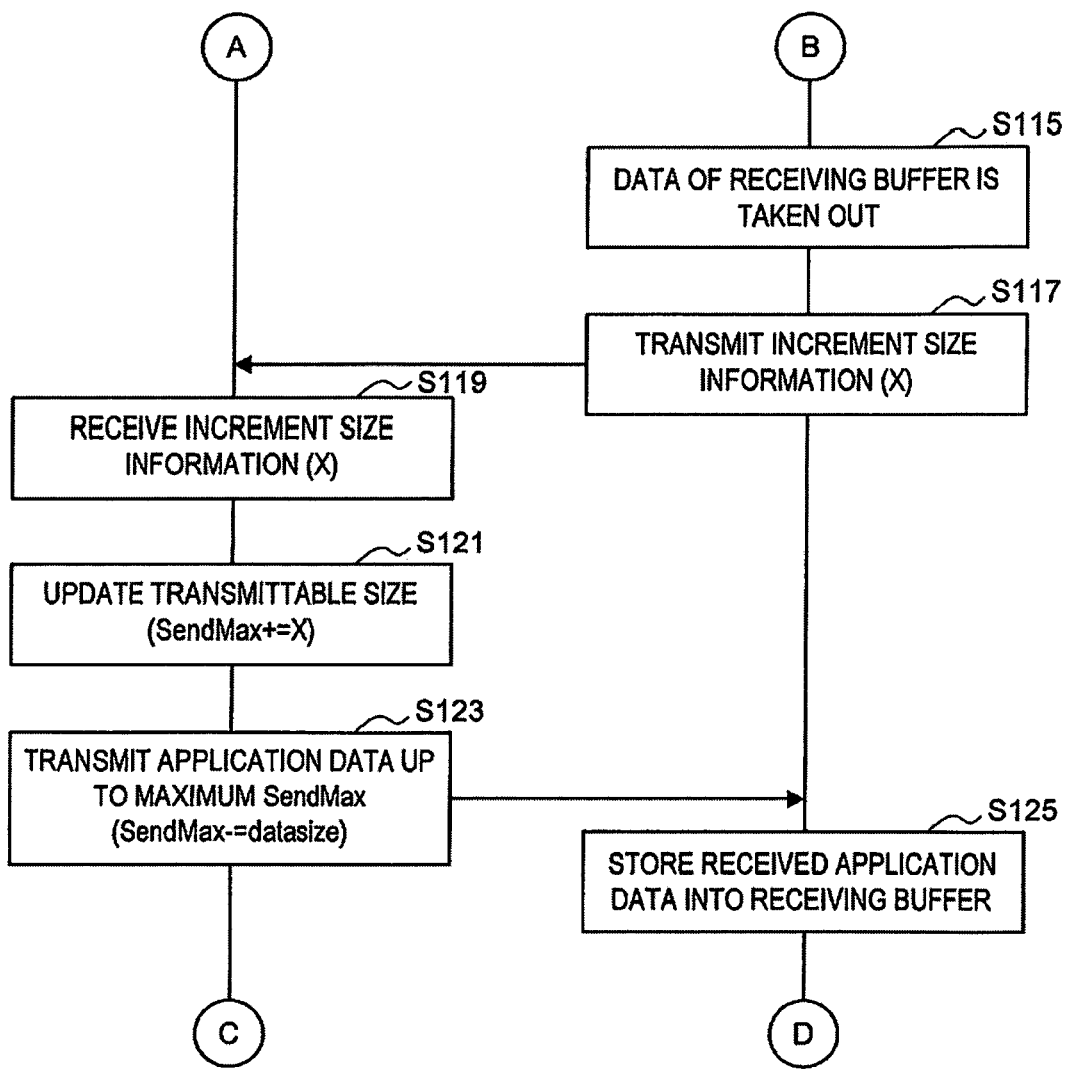
FIG. 7B is a flowchart illustrating an information processing method performed in an information processing system according to the embodiment.
Figure 7C:
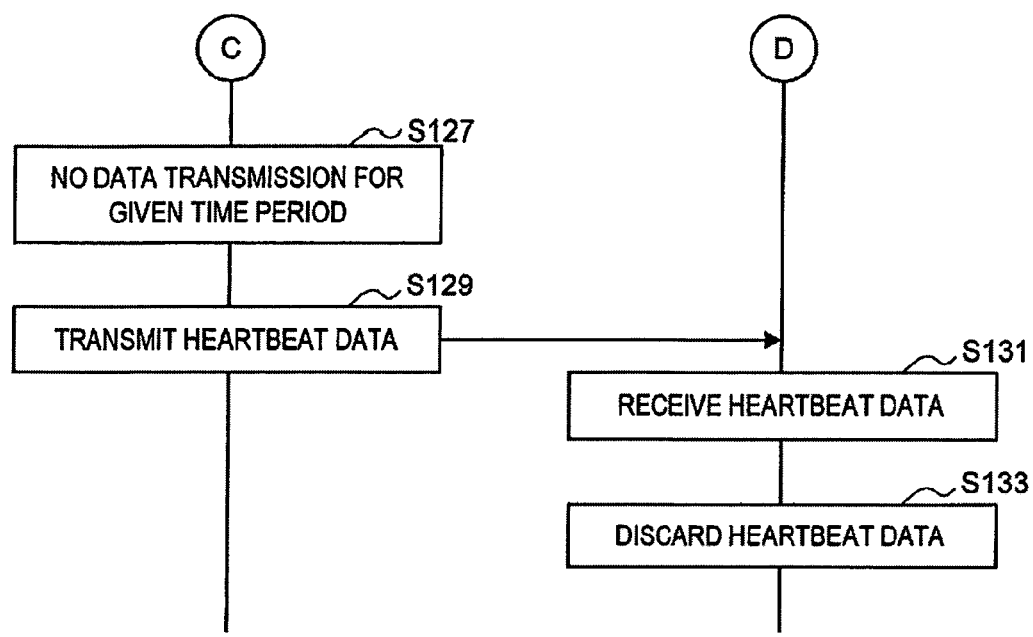
FIG. 7C is a flowchart illustrating an information processing method performed in an information processing system according to the embodiment.

For example, if a connection by HTTP tunneling is established between the client device 20 and the information processing unit 10 as shown in FIG. 6A, the flow control reception management section 121 of the information processing unit 10 refers to a free space in the application data receiving buffer 127. Based on the reference result, the flow control reception management section 121 determines the data size receivable by the application data receiving buffer 127, and supplies it as initial free space size data VS to the flow control transmission management section 211 of the client device 20.

Figure 6B:
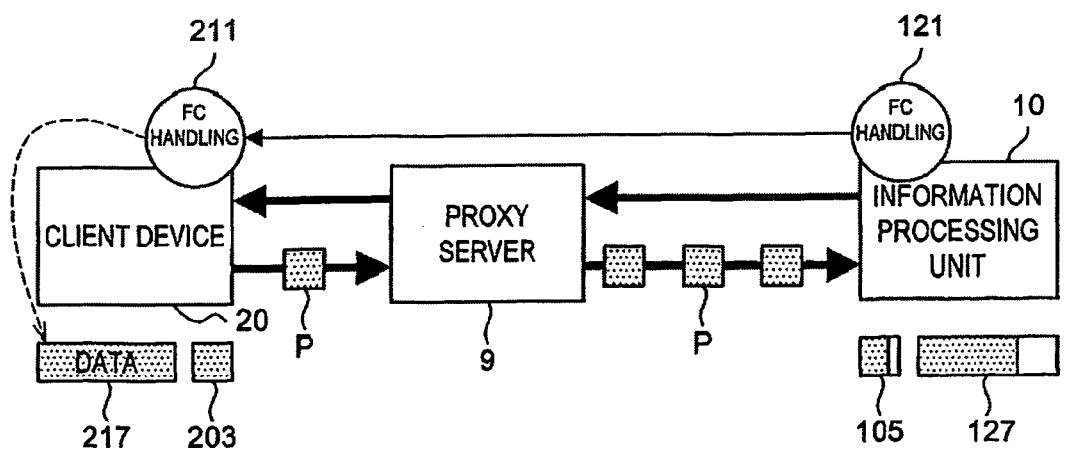
FIG. 6B is an explanatory view illustrating an information processing method performed in an information processing system according to the embodiment.

Receiving the initial free space size data VS, the flow control transmission management section 211 of the client device 20 stores the supplied initial free space size. The flow control transmission management section 211 of the client device 20 acquires data stored in the application data transmitting buffer 217 so as not to exceed the supplied initial free space size and temporarily stores it into the TCP transmitting buffer 203 as shown in FIG. 6B, for example. Then, the communication section 201 of the client device 20 acquires the application data stored in the TCP transmitting buffer 203 and transmits the data by dividing it into several packets P each having a prescribed data size to the information processing unit 10.

The communication section 101 of the information processing unit 10 temporarily stores the received packets P into the TCP receiving buffer 105, and the flow control transmission management section 111 of the information processing unit 10 acquires the application data stored in the TCP receiving buffer 105 and stores it into the application data receiving buffer 127. As a result of repeating such processing, the space in the application data receiving buffer 127 is getting full.

Figure 6C:
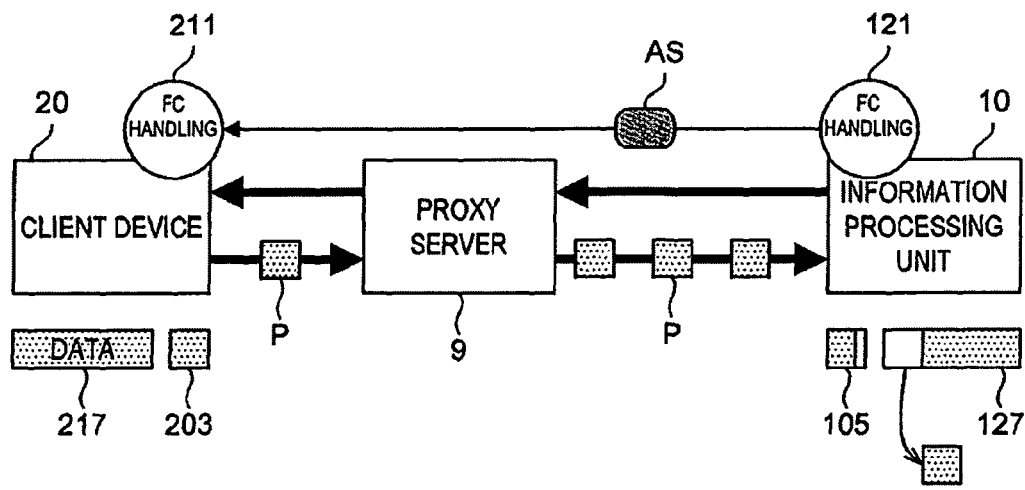
FIG. 6C is an explanatory view illustrating an information processing method performed in an information processing system according to the embodiment.

Then, at a certain timing, the application data receiving section 125 of the information processing unit 10 takes out the application data temporarily stored in the application data receiving buffer 127 from the buffer 127 and transfers it to an upper layer application as shown in FIG. 6C, for example. As a result, a free space is created in the application data receiving buffer 127. Consequently, the flow control reception management section 121 that monitors the free space condition of the application data receiving buffer 127 becomes aware of the size of the free space created in the application data receiving buffer 127. The flow control reception management section 121 of the information processing unit 10 supplies an increment in the free space as increment size data AS to the flow control transmission management section 211 of the client device 20.

Receiving the notification about the increment size data AS, the flow control transmission management section 211 of the client device 20 adds the newly supplied increment size to the previously stored initial free space size and stores it again. The flow control transmission management section 211 of the client device 20 performs additional data transmission if necessary based on the newly stored data size.

Further, after transmitting the data corresponding to the stored initial free space size, the flow control transmission management section 211 of the client device 20 stops transmission of application data so as to avoid that a free space in the TCP receiving buffer 105 of the information processing unit 10 becomes zero.

As described above, according to the information processing method of the embodiment, it is possible to calculate a transmission data size in a transmission source unit with use of a free space in the application data receiving buffer (i.e. the initial free space size data) that is supplied from a transmission destination unit (which is the information processing unit 10 in the above example) at the time of establishing a connection and the increment size data that is supplied when a free space in the application data receiving buffer increases. Therefore, the data size of application data transmitted from the transmission source unit is at most the size of a free space in the application data receiving buffer of the transmission destination unit, so that it is always the data size that can be stored in the application data receiving buffer 127 of the transmission destination unit. Accordingly, there is always a free space in the TCP receiving buffer of the transmission destination unit (which is the TCP receiving buffer 105 of the information processing unit 10 in the above example).

Figure 6D:
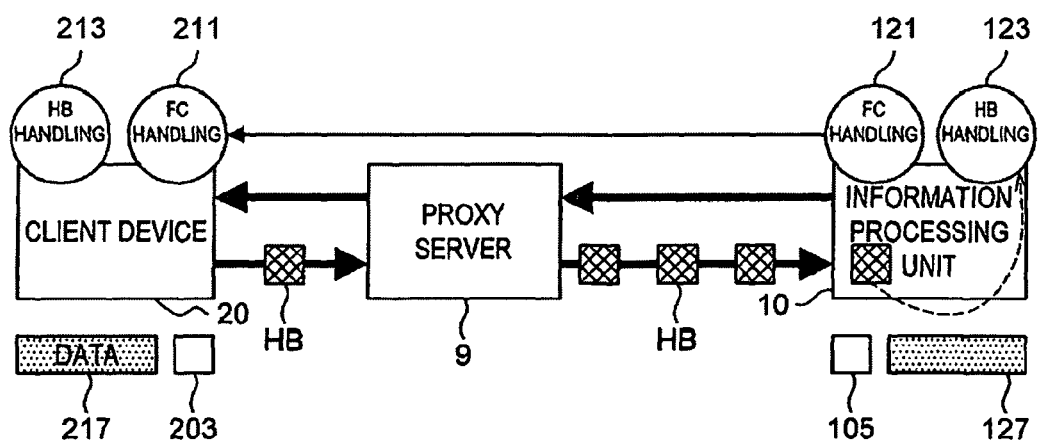
FIG. 6D is an explanatory view illustrating an information processing method performed in an information processing system according to the embodiment.

Further, upon detection that transmission of application data is not performed for a given period of time, the heartbeat transmitting section 213 of the client device 20 transmits heartbeat data HB to the information processing unit 10 as shown in FIG. 6D, for example. Because the TCP receiving buffer 105 of the information processing unit 10 is managed so that there is always a free space, the heartbeat data HB transmitted from the client device 20 is temporarily stored in the TCP receiving buffer 105 of the information processing unit 10. The heartbeat receiving section 123 of the information processing unit 10 immediately takes out the heartbeat data HB stored in the TCP receiving buffer 105 so as to create a free space in the TCP receiving buffer 105 and discards the taken heartbeat data HB.

As a result of such processing, the heartbeat data transmitted from the transmission source unit (which is the client device 20 in the above example) is always received by the transmission destination unit (which is the information processing unit 10 in the above example). It is thereby possible to keep transmitting the heartbeat data HB from the transmission source unit to the transmission destination unit, thus avoiding the closure of a connection by the setting of the proxy server 9.

FIGS. 7A to 7C are sequence charts that show the above descriptions. FIGS. 7A to 7C are flowcharts illustrating an information processing method performed in an information processing system according to the embodiment.

First, when the connection establishment section 207 of the client device 20 makes a request for establishing a connection to the connection wait section 107 of the information processing unit 10, authentication, encryption key determination and so on necessary for communication are determined, and a connection using HTTP tunneling is established (step S101).

Next, the flow control reception management section 121 of the information processing unit 10 transmits initial free space size information (e.g. a space N) based on the free space condition of the application data receiving buffer 127 (step S103).

The flow control transmission management section 211 of the client device 20 receives the initial free space size information transmitted from the information processing unit 10 (step S105) and updates a transmittable data size based on the size described in the initial free space size information (step S107). For example, if the receivable data size described in the initial free space size information is N, the flow control transmission management section 211 sets a maximum transmittable data size SendMax to N. After the application data is stored in the application data transmitting buffer 217 by the application data transmitting section 215 (step S109), the flow control transmission management section 211 transmits the application data until reaching the maximum transmittable data size SendMax (step S111). In this step, the flow control transmission management section 211 subtracts the transmitted data size from the stored maximum transmittable data size SendMax so as not to exceed the notified initial free space size.

The communication section 101 of the information processing unit 10 temporarily stores the transmitted application data into the TCP receiving buffer 105, and the flow control reception management section 121 takes out the data from the TCP receiving buffer 105 and stores it into the application data receiving buffer 127 (step S113). If the application data is taken out from the application data receiving buffer 127 by the application data receiving section 125 at a certain timing (step S115), the flow control reception management section 121 transmits increment size information (e.g. a size X) to the client device 20 (step S117).

The flow control transmission management section 211 of the client device 20 receives the increment size information transmitted from the information processing unit 10 (step S119) and updates the transmittable data size based on the size described in the increment size information (step S121). For example, if the increment data size described in the increment size information is X, the flow control transmission management section 211 adds X to the stored maximum transmittable data size SendMax to thereby set a new maximum data size SendMax. Subsequently, the flow control transmission management section 211 transmits the application data until reaching the maximum transmittable data size SendMax (step S123). In this step, the flow control transmission management section 211 subtracts the transmitted data size from the stored maximum transmittable data size SendMax so as not to exceed the stored data size.

The communication section 101 of the information processing unit 10 temporarily stores the transmitted application data into the TCP receiving buffer 105, and the flow control reception management section 121 takes out the data from the TCP receiving buffer 105 and stores it into the application data receiving buffer 127 (step S125).

In the process of such processing, if it is detected that data is not transmitted for a given period of time (step S127), the heartbeat transmitting section 213 of the client device 20 generates heartbeat data HB and transmits it to the information processing unit 10 (step S129).

Because the TCP receiving buffer 105 of the information processing unit 10 is managed so that there is always a free space, the heartbeat data HB transmitted from the client device 20 is received by the communication section 101 (step S131) and temporarily stored in the TCP receiving buffer 105. The heartbeat receiving section 123 of the information processing unit 10 immediately takes out the heartbeat data HB from the TCP receiving buffer 105 and discards the taken heartbeat data (step S133).

As described above, according to the information processing method of the embodiment, it is possible to calculate a transmission data size in a transmission source unit with use of a free space in the application data receiving buffer (i.e. the initial free space size information) that is supplied from a transmission destination unit at the time of establishing a connection and the increment size information that is supplied when a free space in the application data receiving buffer increases. Therefore, the data size of application data transmitted from the transmission source unit is at most the size of a free space in the application data receiving buffer of the transmission destination unit, so that it is always the data size that can be stored in the application data receiving buffer 127 of the transmission destination unit. Accordingly, there is always a free space in the TCP receiving buffer of the transmission destination unit (which is the TCP receiving buffer 105 of the information processing unit 10 in the above example).

Further, the heartbeat data transmitted from the transmission source unit (which is the client device 20 in the above example) is always received by the transmission destination unit (which is the information processing unit 10 in the above example). It is thereby possible to keep transmitting the heartbeat data HB from the transmission source unit to the transmission destination unit, thus avoiding the closure of a connection by the setting of the proxy server 9.

Although the case where the client device 20 serves as a unit at the data transmitting end and the information processing unit 10 serves as a unit at the data receiving end is described in the foregoing, the above description applies equally to the case where the information processing unit 10 serves as a unit at the data transmitting end and the client device 20 serves as a unit at the data receiving end as well. Specifically, the data receiving section 219 of the client device 20 performs processing in stead of the data receiving section 119 of the information processing unit 10 in the above description, and the data transmitting section 109 of the information processing unit 10 performs processing in stead of the data transmitting section 209 of the client device 20 in the above description.

Further, although the heartbeat data HB is used to maintain an established connection in the above description, the heartbeat data HB may be used to detect a defect in a unit or a communication channel. For example, the heartbeat receiving section in the unit at the receiving end may determine that some defect is occurring in an established connection or a transmission source unit when it detects that heartbeat data HB or application data is not received for a given period of time.

<Hardware Configuration>

Figure 8:
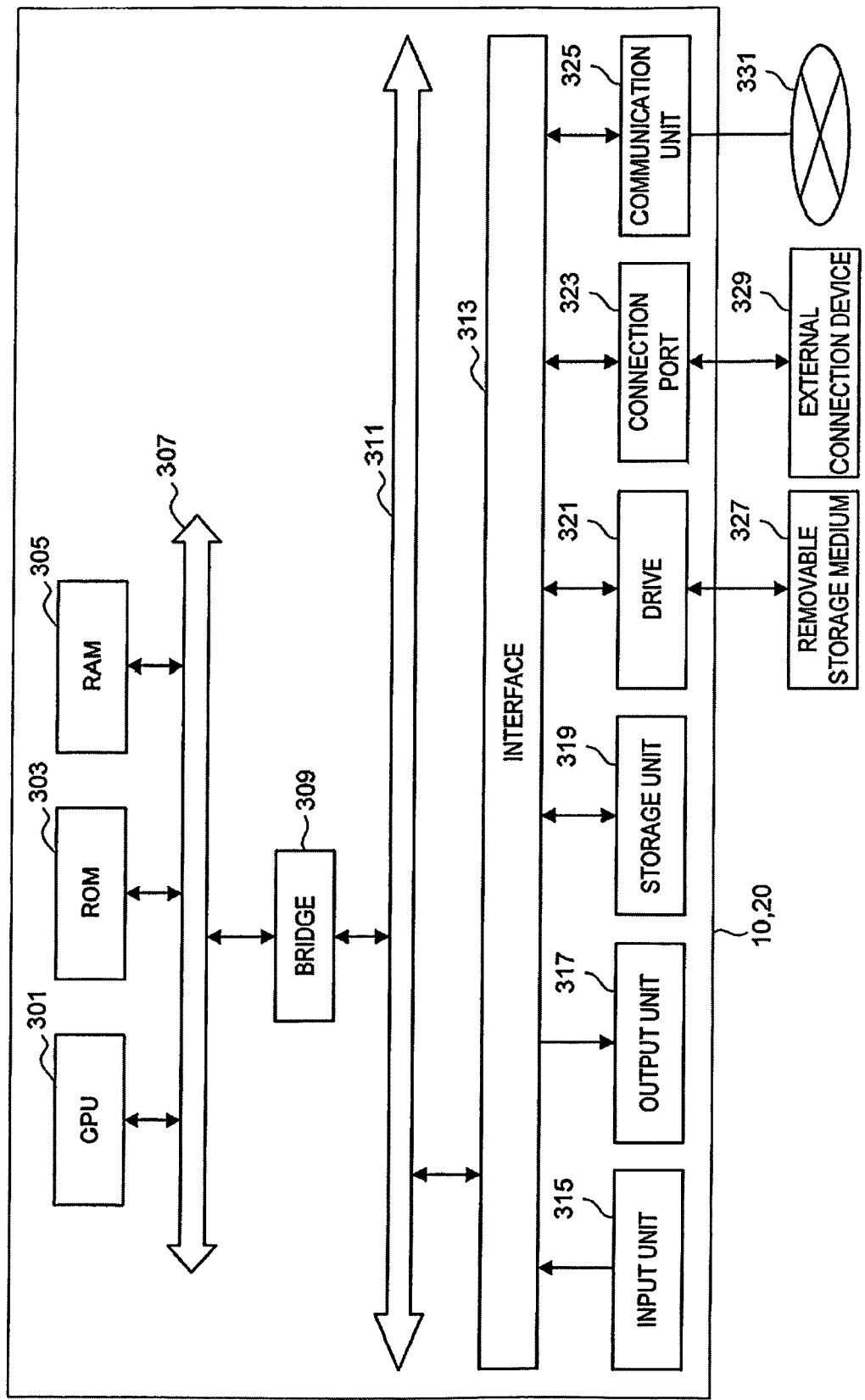
FIG. 8 is a block diagram illustrating the hardware configuration of an information processing unit according to the embodiment.

The hardware configuration of the information processing unit 10 according to the embodiment of the present invention is described hereinafter in detail with reference to FIG. 8. FIG. 8 is a block diagram illustrating the hardware configuration of the information processing unit 10 according to the embodiment.

The information processing unit 10 mainly includes a CPU 301, a ROM 303, a RAM 305, a host bus 307, a bridge 309, an external bus 311, an interface 313, an input unit 315, an output unit 317, a storage unit 319, a drive 321, a connection port 323, and a communication unit 325.

The CPU 301 serves as a processing unit and a control unit, and it controls the whole or part of operation in the information processing unit 10 according to programs stored in the ROM 303, the RAM 305, the storage unit 319 or a removable recording medium 327. The ROM 303 stores a program to be used by the CPU 301, a processing parameter and so on. The RAM 305 primarily stores a program to be used in the execution on the CPU 301, a parameter that varies in the execution and so on. The CPU 301, the ROM 303 and the RAM 305 are connected with each other through the host bus 307, which may be an internal bus such as a CPU bus.

The host bus 307 is connected to the external bus 311 such as a peripheral component interconnect/interface (PCI) bus via the bridge 309.

The input unit 315 is an operating means to be operated by a user, such as a mouse, a keyboard, a touch panel, a button, a switch or a lever, for example. The input unit 315 may be a remote controlling means (or a remote control) using an infrared ray or another radio wave, or an external connection device 329 corresponding to the operation of the information processing unit 10, such as a cellular phone or a PDA. Further, the input unit 315 includes an input control circuit that generates an input signal based on information input by a user using the above operating means and outputs it to the CPU 301, for example. A user of the information processing unit 10 manipulates the input unit 315 to thereby input various data or direct processing operation to the information processing unit 10.

The output unit 317 includes a display device such as a CRT display device, a liquid crystal display device, a plasma display device, an EL display device or a lamp, an audio output device such as a speaker or a headphone, and a device for visually or auditorily presenting acquired information to a user such as a printer, a cellular phone or a facsimile, for example. The output unit 317 outputs a result obtained by processing of the information processing unit 10, for example. Specifically, the display device displays a result obtained by processing of the information processing unit 10 by a text or an image. The audio output device converts an audio signal containing reproduced audio data, acoustic data and so on into an analog signal and outputs it.

The storage unit 319 is a device for data storage that is configured as an example of a storage section of the information processing unit 10. The storage unit 319 may be configured by a magnetic storage device such as a hard disk drive (HDD), a semiconductor storage device, an optical storage device, a magneto-optical storage device or the like. The storage unit 319 stores a program to be executed by the CPU 301, various data, acoustic signal data or image signal data acquired from the outside, and so on.

The drive 321 is a reader/writer for a storage medium, which is built in the information processing unit 10 or attached externally. The drive 321 reads information that is recorded in the removable storage medium 327 such as a magnetic disk, an optical disk, a magneto-optical disk or a semiconductor memory which is attached thereto and outputs the information to the RAM 305. Further, the drive 321 can write information into the removable storage medium 327 such as a magnetic disk, an optical disk, a magneto-optical disk or a semiconductor memory which is attached thereto. The removable storage medium 327 may be a DVD medium, an HD-DVD medium, a Blu-ray medium, a compact flash (CF) (registered trademark), a memory stick, a secure digital (SD) memory card or the like. Further, the removable storage medium 327 may be an integrated circuit (IC) card or an electronic device with a contactless IC chip mounted thereon.

The connection port 323 is a port for directly connecting a device to the information processing unit 10, such as a universal serial bus (USB) port, an IEEE 1394 port such as i.Link, a small computer system interface (SCSI) port, an RS-232C port, an optical audio terminal, or a high-definition multimedia interface (HDMI) port. By connecting the external connection device 329 to the connection port 323, the information processing unit 10 can directly acquire acoustic signal data and image signal data from the external connection device 329 or supply acoustic signal data and image signal data to the external connection device 329.

The communication unit 325 is a communication interface that is configured by a communication device or the like for establishing a connection with 1 communication network 331, for example. The communication unit 325 may be a communication card for wired or wireless local area network (LAN), Bluetooth or wireless USB (WUSB), a router for optical communication, a router for asymmetric digital subscriber line (ADSL) or a modem for various kinds of communications, for example. The communication unit 325 can transmit and receive an acoustic signal or the like to and from the Internet or another communication device. Further, the communication network 331 connected to the communication unit 325 is configured by a network or the like connected by wired or wireless means, and it may be the Internet, home LAN, infrared data communication, radio wave communication, satellite communication and so on.

One example of the hardware configuration capable of implementing the functions of the information processing unit 10 according to the embodiment of the present invention is described in the foregoing. Each of the above-described elements may be configured using a general-purpose member or circuit, or it may be configured by hardware specialized to the function of each element. It is thereby possible to change the hardware configuration to use as appropriate according to the technique level when implementing the embodiment.

The client device 20 according to the embodiment of the present invention has substantially the same hardware configuration as the information processing unit 10 according to the embodiment of the present invention, and therefore repeated explanation is omitted.

The information processing unit 10 according to the embodiment of the present invention may be provided as a program having the following functions. The program causes a computer to implement a connection wait function to establish a connection with a client device that initiates a connection, a flow control reception management function to transfer the data transmitted from the client device to an application data receiving buffer, monitor a free space in the application data receiving buffer and supply a data size receivable by the application data receiving buffer to the client device, and an application data receiving function to acquire the data transmitted from the client device from the application data receiving buffer and transmit the data to an upper layer application.

The computer program is stored in a storage section included in the computer, and it is read by a CPU included in the computer and executed, thereby causing the computer to function as the information processing unit 10 described above. There is also provided a computer readable recording medium in which the computer program is stored. The recording medium may be a magnetic disk, an optical disk, a magneto-optical disk, flash memory and so on, for example. The computer program may be distributed through a network, for example, without use of a recording medium.

Further, the client device 20 according to the embodiment of the present invention may be provided as a program having the following functions. The program causes a computer to implement a connection establishment function to initiate a connection with an information processing unit and establish a connection with the information processing unit, an application data transmitting function to acquire data to be transmitted to the information processing unit from an upper layer application and transfer the data to an application data transmitting buffer, and a flow control transmission management section to acquire the data to be transmitted to the information processing unit from the application data transmitting buffer and transmit the acquired data to the information processing unit based on a data size receivable by the information processing unit supplied from the information processing unit.

The computer program is stored in a storage section included in the computer, and it is read by a CPU included in the computer and executed, thereby causing the computer to function as the client device 20 described above. There is also provided a computer readable recording medium in which the computer program is stored. The recording medium may be a magnetic disk, an optical disk, a magneto-optical disk, flash memory and so on, for example. The computer program may be distributed through a network, for example, without use of a recording medium.

As described in the foregoing, according to the embodiment of the present invention, it is possible to perform HTTP tunneling for a unit connected with a proxy server to which a general setting condition of disconnecting a TCP connection of an HTTP transaction upon detection of inactivity is set.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing unit comprising:
   a connection wait section to establish a connection with a client device for initiating a connection;
   a Transfer Control Protocol (TCP) receiving buffer to store first data received from the client device; and
   a data receiving section to receive the first data from the TCP receiving buffer, the data receiving section comprising:
   an application data receiving buffer to receive the first data stored in the TCP receiving buffer;
   an application data receiving section to acquire the first data from the application data receiving buffer and transmit the first data to an upper layer application; and
   a flow control reception management section to monitor a free space in the application data receiving buffer and supply a data size receivable by the application data receiving buffer to the client device, wherein the data size receivable is used by the client device to determine a size of first data to be subsequently transmitted to the information processing unit.

2. The information processing unit according to claim 1, wherein
the flow control reception management section supplies the data size receivable by the application data receiving buffer to the client device upon establishment of the connection with the client device.

3. The information processing unit according to claim 1, wherein
the flow control reception management section supplies an increment in the free space in the application data receiving buffer to the client device upon increase in the free space in the application data receiving buffer.

4. The information processing unit according to claim 1, further comprising:
a communication section to control communication with the client device, wherein the TCP receiving buffer temporarily stores the first data received from the client device by the communication section,
wherein the flow control reception management section transfers the first data temporarily stored in the TCP receiving buffer to the application data receiving buffer.

5. The information processing unit according to claim 1, further comprising:
a connection maintenance control information receiving section to receive connection maintenance control information transmitted from the client device,
wherein the connection maintenance control information receiving section discards the received connection maintenance control information upon reception of the connection maintenance control information in the TCP receiving buffer.

6. The information processing unit according to claim 1, further comprising:
a data transmitting section to transmit second data to the client device, the data transmitting section comprising:
an application data transmitting buffer to store the second data to be transmitted to the client device;
an application data transmitting section to acquire the second data to be transmitted to the client device from the upper layer application and transfer the second data to the application data transmitting buffer; and
a flow control transmission management section to acquire the second data from the application data transmitting buffer and transmit the second data to the client device based on a data size receivable by the client device, supplied from the client device.

7. The information processing unit according to claim 6, further comprising
a communication section to control communication with the client device; and
a communication section transmitting buffer to store the second data to be transmitted to the client device by the communication section,
wherein the flow control transmission management section transfers the second data stored in the application data transmitting buffer to the communication section transmitting buffer.

8. An information processing method performed by an information processing unit, the information processing method comprising:
establishing a connection with a client device;
supplying a data size receivable by an application data receiving buffer to the client device based on a free space in the application data receiving buffer to store first data transmitted from the client device, wherein the data size receivable is used by the client device to determine a size of the first data to be subsequently transmitted to the information processing unit;
storing the first data transmitted from the client device into a Transfer Control Protocol (TCP) receiving buffer;
transferring the first data stored in the TCP receiving buffer to the application data receiving buffer; and
transmitting the data temporarily stored in the application data receiving buffer to an upper layer application.

9. The information processing method according to claim 8, further comprising:
acquiring second data to be transmitted to the client device from the upper layer application and transferring the second data to an application data transmitting buffer to store the second data to be transmitted to the client device; and
acquiring the second data from the application data transmitting buffer and transmitting the second data to the client device based on a data size receivable by the client device, supplied from the client device.

10. A client device comprising:
a connection establishment section to initiate and establish a connection with an information processing unit; and
a data transmitting section to transmit first data to the information processing unit, the data transmitting section comprising:
an application data transmitting buffer to store the first data to be transmitted to the information processing unit;
an application data transmitting section to acquire the first data from an upper layer application and transfer the first data to the application data transmitting buffer; and
a flow control transmission management section to acquire the first data from the application data transmitting buffer and transmit the first data to the information processing unit based on a data size receivable by an application data receiving buffer of the information processing unit, previously supplied from the information processing unit, wherein the first data transmitted by the client device is transferred to the application data receiving buffer from a Transfer Control Protocol (TCP) receiving buffer of the information processing unit, wherein the TCP receiving buffer stores the first data received from the client device.

11. The client device according to claim 10, further comprising:
a data receiving section to receive second data transmitted from the information processing unit, the data receiving section comprising:
an application data receiving buffer to store the second data transmitted from the information processing unit;
an application data receiving section to acquire the second data from the application data receiving buffer and transmit the second data to the upper layer application; and
a flow control reception management section to monitor a free space in the application data receiving buffer of the client device and supply a data size receivable by the application data receiving buffer of the client device to the information processing unit, and transfer the second data transmitted from the information processing unit to the application data receiving buffer of the client device.

12. An information processing method performed by a client device, the information processing method comprising:
initiating and establishing a connection with an information processing unit;
acquiring first data to be transmitted to the information processing unit from an upper layer application and transferring the first data to an application data transmitting buffer to store the first data to be transmitted to the information processing unit; and
acquiring the first data from the application data transmitting buffer and transmitting the first data to the information processing unit based on a data size receivable by an application data receiving buffer of the information processing unit, previously supplied from the information processing unit, wherein the first data transmitted by the client device is transferred to the application data receiving buffer from a Transfer Control Protocol (TCP) receiving buffer of the information processing unit, wherein the TCP receiving buffer stores the first data received from the client device.

13. The information processing method according to claim 12, further comprising:
supplying a data size receivable by an application data receiving buffer of the client device to the information processing unit based on a free space in the application data receiving buffer of the client device to store second data transmitted from the client device; and
storing the second data transmitted from the information processing unit into the application data receiving buffer of the client device; and
transmitting the second data stored in the application data receiving buffer of the client device to the upper layer application.

14. An information processing system comprising:
a client device, comprising:
a connection establishment section to initiate and establish a connection with an information processing unit; and
a data transmitting section to transmit first data to the information processing unit, the data transmitting section comprising:
an application data transmitting buffer to store the first data to be transmitted to the information processing unit;
an application data transmitting section to acquire the first data to be transmitted to the information processing unit from an upper layer application of the client device and transfer the first data to the application data transmitting buffer; and
a flow control transmission management section to acquire the first data from the application data transmitting buffer and transmit the first data to the information processing unit based on a data size receivable by an application data receiving buffer of the information processing unit, previously supplied from the information processing unit; and
the information processing unit, comprising:
a connection wait section to establish the connection with the client device;
a Transfer Control Protocol (TCP) receiving buffer to store the first data received from the client device; and
a data receiving section to receive the first data from the TCP receiving buffer, the data receiving section comprising:
an application data receiving buffer to receive the first data stored in the TCP receiving buffer,
an application data receiving section to acquire the first data from the application data receiving buffer and transmit the first data to an upper layer application of the information processing unit; and
a flow control reception management section to monitor a free space in the application data receiving buffer and supply a data size receivable by the application data receiving buffer to the client device, wherein the data size receivable is used by the client device to determine a size of the first data to be subsequently transmitted to the information processing unit.

15. The information processing system according to claim 14, wherein
the data transmitting section of the client device further comprises:
a connection maintenance control information transmitting section to transmit connection maintenance control information for maintaining a connection established with the information processing unit; and
the connection maintenance control information transmitting section transmits the connection maintenance control information to the information processing unit when communication is not performed with the information processing unit for a given period of time.

16. The information processing system according to claim 14, wherein
the information processing unit further comprises:
a data transmitting section to transmit second data to the client device, the data transmitting section comprising:
an application data transmitting buffer to store the second data to be transmitted to the client device;
an application data transmitting section to acquire the second data to be transmitted to the client device from the upper layer application of the information processing unit and transfer the second data to the application data transmitting buffer of the information processing unit; and
a flow control transmission management section to acquire the second data from the application data transmitting buffer of the information processing unit and transmit the second data to the client device based on a data size receivable by the client device, wherein the data size receivable by the client device is supplied from the client device; and
the client device further comprises:
a data receiving section to receive the second data transmitted from the information processing unit, the data receiving section comprising:
an application data receiving buffer to store the second data transmitted from the information processing unit;
an application data receiving section to acquire the second data transmitted from the information processing unit from the application data receiving buffer of the client device and transmit the second data to the upper layer application of the client device; and
a flow control reception management section to monitor a free space in the application data receiving buffer and supply a data size receivable by the application data receiving buffer to the information processing unit, and transfer the second data transmitted from the information processing unit to the application data receiving buffer of the client device.

* * * * *